(12) United States Patent
Liao

(10) Patent No.: US 6,633,865 B1
(45) Date of Patent: Oct. 14, 2003

(54) MULTITHREADED ADDRESS RESOLUTION SYSTEM

(75) Inventor: Heng Liao, Burnaby (CA)

(73) Assignee: PMC-Sierra Limited, Burnaby (CA)

( * ) Notice: Subject to any disclaimer, the term of this patent is extended or adjusted under 35 U.S.C. 154(b) by 0 days.

(21) Appl. No.: 09/471,263

(22) Filed: Dec. 23, 1999

(51) Int. Cl.[7] .............. G06F 17/30; G06F 7/00; G06F 15/16; G06F 15/173

(52) U.S. Cl. .............. 707/3; 707/1; 709/231; 709/243

(58) Field of Search .............. 707/3, 1; 709/243, 709/231, 232

(56) References Cited

U.S. PATENT DOCUMENTS

| | | | |
|---|---|---|---|
| 5,179,702 A | * | 1/1993 | Spix et al. .............. 395/650 |
| 5,506,999 A | | 4/1996 | Skillman et al. |
| 5,938,736 A | * | 8/1999 | Muller et al. .............. 709/243 |
| 5,999,734 A | | 12/1999 | Willis et al. |
| 6,047,281 A | * | 4/2000 | Wilson et al. .............. 707/3 |

FOREIGN PATENT DOCUMENTS

CA   2 350 922   5/2001

* cited by examiner

*Primary Examiner*—Safet Metjahic
*Assistant Examiner*—Cindy Nguyen
(74) *Attorney, Agent, or Firm*—Shapiro Cohen

(57) ABSTRACT

An apparatus for executing a multiple step database lookup procedure, the apparatus including a plurality of processing units, at least two processing units being coupled to a memory containing a database to be looked up, and a plurality of data pipelines which couple the plurality of processing units to each other and to external apparatus, wherein each processing unit executes at least one step in the multiple step database lookup procedure.

25 Claims, 6 Drawing Sheets

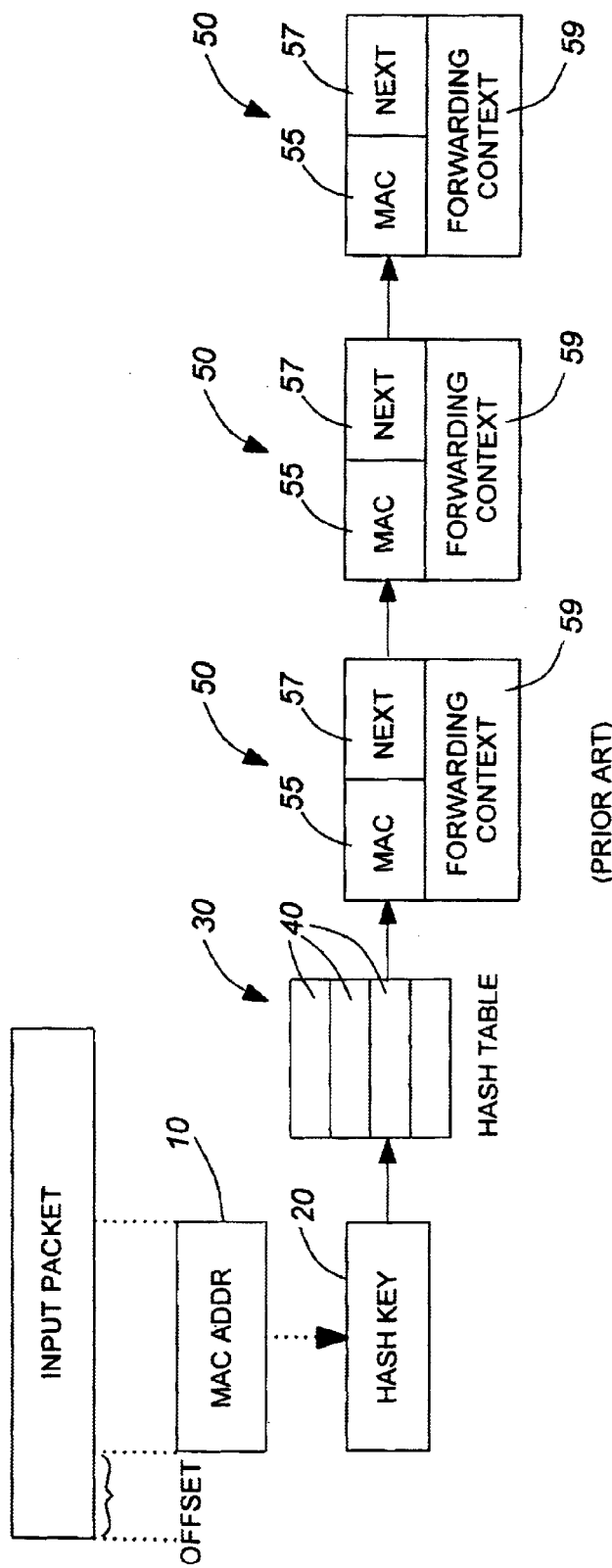
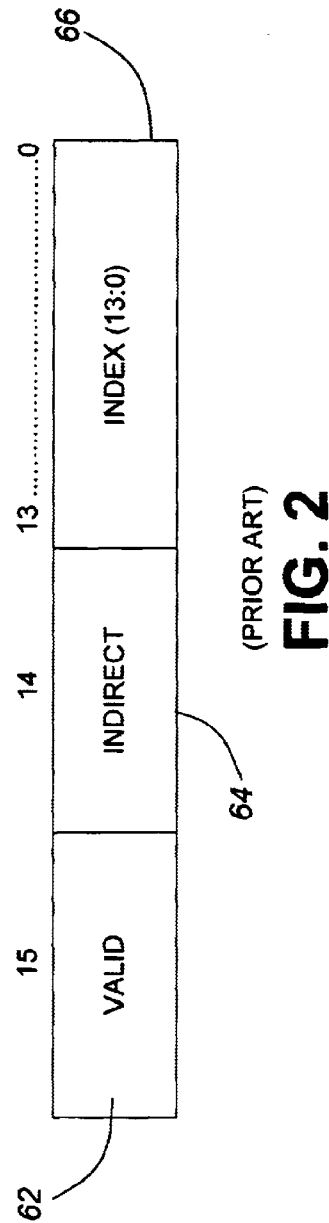
FIG. 1 (PRIOR ART)
FIG. 2 (PRIOR ART)

RT0

| ENTRY # | VALID | INDIRECT | INDEX |
|---|---|---|---|
|  |  |  |  |
| 2 | 0 | 0 | 0 |
| 3 | 1 | 1 | 5 |
| 4 | 1 | 1 | 6 |
| 5 | 1 | 0 | 100 |
| 6 | 1 | 0 | 110 |
| 7 | 0 | 0 | - |
| 8 | 1 | 1 | 7 |
|  |  |  |  |
|  |  |  |  |
|  |  |  |  |
|  |  |  |  |

RT1

| ENTRY # | VALID | INDIRECT | INDEX |
|---|---|---|---|
|  |  |  |  |
| $5 + A_7$ | 1 | 0 | 112 |
| ⋮ | ⋮ | ⋮ | ⋮ |
| $6 + F_7$ | 1 | 1 | 12 |
| ⋮ | ⋮ | ⋮ | ⋮ |
| - | - | - | - |
| $7 + C_7$ | 0 | 0 | - |
| 8 | 1 | 0 | 113 |
| - | - | - | - |
| 9 | 1 | 0 | 114 |
|  |  |  |  |
|  |  |  |  |

RT2

| ENTRY # | VALID | INDIRECT | INDEX |
|---|---|---|---|
|  |  |  |  |
| $12 + F_8$ | 1 | 0 | 119 |
| 13 | 0 | 0 | 115 |
| 14 | - | - | - |
| - | - | - | - |
| 15 | - | - | - |
| 16 | 0 | 0 | - |
|  |  |  |  |
|  |  |  |  |

(PRIOR ART)

FIG. 4

MULTITHREADED ADDRESS RESOLUTION SYSTEM

FIELD OF THE INVENTION

The invention relates to the field of data transmissions and in particular to devices and methods which provide packet network address resolution.

BACKGROUND TO THE INVENTION

Address resolution is a key function of network equipment such as routers and switches. The source, destination, and media access rights of network packets are usually determined using the addresses contained within the packets. Usually, forwarding decisions, such as where to deliver a data packet, are made based on at least one of the addresses carried in the data packet. These addresses are used as the key to determine from a database, containing address dependent information, which egress or exit port the packet should be sent to, or more generally, how the packet should be processed. Given that the forwarding decision is to be made for each packet, address resolution must therefore be performed for each packet. Address resolution entails extracting the different addresses from within the packet and using these addresses in a database lookup procedure to find the required routing information. The database lookup procedure can require up to several lookup operations based on source and destination addresses of several network protocol layers. Because modern switches and routers need to deal with a number of ports running at high speed, with each port receiving or transmitting multiple pockets, providing fast address resolution becomes a challenging problem to solve.

The problem of fast address resolution is exacerbated by the numerous lookup procedures used to perform required network routing functions such as MAC (medium access control) lookup and IP (internet protocol) longest prefix match lookup. Procedures such as hashing, multi-stage table lookup, and caching have been developed to perform these functions.

Ethernet layer 2 MAC address lookup and layer 3 IP longest prefix match are required in numerous networks. In the Ethernet standard, each network device is assigned a unique hexadecimal serial number, a MAC address, which identifies it on the network. Because of this scheme and the uniqueness of the MAC address of every device on the network, each network device can monitor network traffic and look for its own MAC address in each packet to determine if that packet should be decoded or not. Specific network devices, such as routers, switches and bridges, are able to determine the network source and destination of a packet simply by monitoring the MAC addresses within that packet. With this data, the network device can determine whether the packet should be decoded or not. By way of an example, a learning bridge can, by monitoring MAC addresses in packets, determine which addresses are on which side of a connection. By monitoring the source and destination MAC addresses in packets, a learning bridge can determine, when it receives a packet, whether that packet must cross the bridge or not.

Given the number of packets a network device receives, a fast MAC address lookup is desirable. One widely used procedure for MAC address lookup has been hashing. By way of example, if we wish to have B classes numbered 0,1, . . . , B-1, then we use a hash function h such that for each object x, h(x) is one of the integers 0 through B-1. The value of h(x) is the class to which x belongs. x is therefore the key and h(x) is the hash value of x. The "classes" are normally referred to as buckets such that it is customary to refer to x as belonging to bucket h(x).

With respect to MAC address lookup, such a hash structure is used. FIG. 1 illustrates the procedure. The 48 bit MAC address 10 is used to calculate a hash key 20 that indexes the hash table 30. Each hash table entry 40 contains a head pointer to the linked list of hash buckets 50 for the MAC addresses with the same hash key. The hash bucket header contains the MAC address 55, the next pointer for the linked list 57, and the forwarding context data structure 59 that is defined by the application that uses the address resolution system.

The MAC address lookup procedure begins with the address extraction. The MAC address is extracted by simple offsetting—the MAC address is found at a specific predetermined offset from the beginning of each packet. The extracted MAC address 10 is used to calculate the hash key 20. The head pointer of the hash bucket chain is fetched from the hash table 30 using the hash key 20. The address resolution system recursively fetches the hash bucket header and compares the MAC address stored in the bucket header with the MAC address that is being looked up until either a match is found or the end of the linked list is reached. After finding a match, the address resolution system fetches the remaining part of the hash bucket and presents it as the lookup result.

IP addresses, on the other hand, are the actual addresses which determine the logical location of a network node on the network. Routers, devices which determine the route a packet must take to reach its destination IP address, must correctly determine for each incoming packet which port to send the packet and the next hop that packet must take. For each incoming packet, a search must be performed in the router's forwarding table to determine which next hop the packet is destined for.

One longest prefix match procedure that combines speed with ease of hardware implementability is the multistage lookup procedure outlined by Gupta et al. in "Routing Lookups in Hardware at Memory Access Speeds", *IEEE Infocom*, April 1998. A modified version of the Gupta et al procedure simplifies the lookup procedure and simplifies its implementation.

In this modified version of the Gupta et al procedure, conceptually illustrated in FIG. 3, the IP address database contains three separate route tables and the route context table. The route tables RT0, RT1, and RT2 are segmented to provide for routes of various prefix lengths. Route table RT0 provides for all routes of prefix length 17 or less while route table RT1 provides for all routes of prefix length 18 to 24 and route table RT2 provides for routes of prefix length 25 and longer. All three route tables contain entries of identical format as shown in FIG. 2. Each entry has two 16-bit records, each record containing two control bits, a VALID bit 62 and an INDIRECT bit 64, and a 14-bit memory index 66. The base addresses for the route tables are predetermined and set, making it easier to reference each route table independent of the others. Once the correct route is found, the memory pointer in the record points to an entry in the Route Context table RC. (It should be noted that in this example, a 32-bit memory width is assumed. Thus, each route table entry can accomodate two 16-bit records. However, this procedure can be adapted for implementation in any computer system. Ideally, each route table can be seen as simply a collection of 16-bit records.) Given a destination IP address, the procedure begins by extracting the most significant 17-bits 72 of the destination IP address contained in the input packet. The predetermined base address 73 of the first route table RT0 is added to the 17 bits 72 extracted from the given destination IP address, thereby forming a complete memory address 74 to a selected entry in the first route table RT0. This first route table RT0 contains entries for all established routes of 17-bit prefix length or less.

As noted above, each entry in the first route table RT0 contains a 14 bit memory index 66. For routes with prefix length 17 bits or less, the memory index 66 is a pointer into a route context table RC. For routes longer than 17 bits, the INDIRECT control bit 64 in the route table RT0 entry is set, indicating that the 14 bit memory index 66 contained in the route table RT0 table entry is to be used as a pointer to index into a second route table RT1. The index into route table RT1 from the route table RT0 table entry is concatenated with the following 7 bits 75 of the given destination IP address and the predetermined base address 76 of the second route table RT1 to form a complete address 77 of a selected entry in the second route table RT1.

Since this second route table RT1 contains entries having the same format as the entries in the first route table RT0, the INDIRECT control bit 64 in the entry in route table RT1 designates whether the memory index 66 in the route table RT1 entry points to an entry in the route context table RC or whether it is to be used as an index into a third route table RT2. For routes of prefix lengths 18–24 the INDIRECT control bit 64 in the route table RT1 entry should not be set, thereby indicating that the memory index 66 in the route table RT1 entry should point to an entry in the route context table RC. For routes with a prefix length longer than 24, the INDIRECT control bit 64 should be set, thereby indicating that the memory index 66 in the route table RT1 entry is to be used as a pointer to index a third route table RT2.

If the INDIRECT bit 64 is set in the entry in the second route table RT1, the least significant 8 bits 78 of the given destination IP address is concatenated with the memory index 66 found in the selected route table RT1 entry and the predetermined base address 79 of the third route table RT2, thereby forming a complete address 81 of an entry in the third route table RT2. In this third and final route table RT2, the INDIRECT bit 64 is not used and the memory index 66 contained in the entry is used to index into the route context table RC.

If, in any of the above steps, the VALID bit 62 is not set, then the IP address being searched for is invalid and the search must terminate. If a specific IP address does not have an entry in the route table RT2, even after passing through route tables RT1 and RT0, then that specific IP address is considered invalid and the search also terminates.

The route context table RC contains the addresses of exit ports. Through the modified Gupta et al procedure outlined above, an entry in the route context table RC is selected for a given destination IP address, thereby determining which exit port should be used by a packet with the given destination IP address. This defines the next hop that the data packet must take.

Given the above procedure, the steps taken to find a route context will be illustrated.

By way of example, assume that the route context RC table entries for six destination IP addresses A,B,C,D,E,and F are to be determined. For simplicity, assume that $X_{17}$ refers to the most significant 17 bits of the IP address X, that $X_7$ refers to the following 7 bits of the destination IP address X, and that $X_8$ refers to the least significant 8 bits of the same address. For this example, we can assume that the table entries for RT0, RT1, and RT2 are as shown in FIG. 4 following the format outlined in FIG. 2. For this example, the following examples will have the following meanings :

$BA_{RTx}$—Base address of Rtx

RT0(x)—entry x in route table RT0 (similar notations will be used for the other route tables and for the route context table)

Taking IP address A first, if $BA_{RT0}+A_{17}\text{–>}RT0(3)$ (meaning that adding the base address of RT0 to the most significant 17 bits of A yields entry 3 in RT0), then the index to RT1 is 5.

Therefore, from the table entries in FIG. 4, $$BA_{RT0}+A_{17}\text{–>}RT0(3)\text{=>}BA_{RT1}+5+A_7\text{–>}RT1(5+A_7)\text{=>}RC(112)$$

This means that the final end result is entry 112 in the Route Context table.

Similarly, we can follow the following operations for the other addresses:

$$BA_{RT0}+B_{17}\text{–>}RT0(5)\text{–>}RC(100)$$

$$BA_{RT0}+C_{17}\text{–>}RT0(8)=BA_{RT1}+7+C_7\text{–>}RT1(7)\text{–>}\text{INVALID}$$

$$BA_{RT0}+D_{17}\text{–>}RT0(7)\text{–>}\text{INVALID}$$

$$BA_{RT0}+E_{17}\text{–>}RT0(6)\text{–>}RC(110)$$

$$BA_{RT0}+F_{17}\text{–>}RT0(4)=BA_{RT1}+6+F_7\text{–>}RT1(6+F_7)=BA_{RT2}+12+F_8\text{–>}RT2(12)\text{–>}RC(119)$$

We can summarize the results of the search for the route contexts of the addresses as follows:

A–>RC(112)

B–>RC(100)

C–>INVALID

D–>INVALID

E–>RC(110)

F–>RC(119)

The two above procedures for MAC address lookup and IP longest prefix match suffer from one drawback or another when implemented in either hardware or software using traditional methods used to increase the throughput of an address resolution system.

One traditional method is the use of a sequential processing unit. In this method, the logic is designed to follow the control path of the look-up flow chart with the address resolution process being completed in sequential steps, including database lookup and address extraction. Unfortunately, this method provides a low throughput.

Another traditional method is the use of a pipelined processing unit. In this method, the address resolution process is divided into a fixed number (N) of steps with the search context being passed along the pipeline as each step of the processing is completed. At most, N address look-up threads can be processed in parallel. However, to have an efficient pipeline, the process must be divided into a fixed number of processing stages with each stage requiring an equal amount of processing time. Unfortunately, most hash look-up procedures and multistage memory look procedures have an indeterministic but bounded number of look-up steps, with the next step being determined by the intermediate result of the previous step. The dynamic nature of such procedures therefore makes this static pipelining approach unsuitable.

A third method uses a channelized processing unit. Multiple parallel instances of this processing unit is replicated in a multi-channel system with each channel comprising separate address resolution search engines running in parallel to other channels. Ideally, system performance should scale with the number of processing units. However, this is not the case. Given N instances of identical processing units, the actual system performance speedup is between $\log_2 N$ and $N/\ln N$ (see Computer Architecture and Parallel Processing, K Hwang and Briggs, McGraw-Hill Publishing company, 1984, pp 27–29). Also, this method can be quite expensive given that either multiple parallel instances of RAM must be used to store the look-up database or a multi-port shared memory access controller is required to arbitrate the memory accesses among the search engines. While the multi-port shared memory structure may be efficient, having multiple separate search engines along with a memory access controller with a large number of ports is not.

Accordingly, given the unsuitability, inefficiency, and cost considerations of the traditional methods used to increase the speed of address resolution systems, what is required is a method or device that can be used with different lookup procedures such as hashing and multistage lookup without incurring the drawbacks of the traditional methods.

SUMMARY OF THE INVENTION

The present invention is a method and a module for executing different database lookup procedures for resolving network addresses. Separate modules are used for each database lookup procedure allowing multiple, independent lookup procedures to be implemented on the same system. Within each module, at least two processing units, each processing unit operating independently of one another and each processing unit coupled to a memory and to one another by data pipelines, divide the database lookup procedure into multiple stages. A feedback loop between at least two of these processing units is implemented using data pipelines, thereby allowing complex branching and looping functions between the processing units. Also within the modules, the data pipelines and the independently operating processing units allow multiple database lookup threads to execute independently of one another, thereby increasing system throughput.

By having at least two processing units per module, the modules are scalable within themselves and hence adaptable to different database lookup procedures. Furthermore, the feedback loop within the module allows for the implementation of database lookup procedures that have a dynamic number of steps.

Data pipelines also couple separate modules, allowing data exchange between the modules.

It should be noted that for the purposes of this application a data pipeline is defined as a hardware device or a software data structure that has the properties of a queue or of a FIFO (first-in first-out) list or register. By this definition, a data pipeline receives all incoming data at a receiving end and buffers this data in the order the data was received. The data pipeline then transmits the buffered data at a transmitting end, again in the order in which the data was received.

It should also be noted that a search context for the purposes of this application is defined as data required not only to identify a search but also to define that search. A search context therefore includes a search identifier that identifies the specific search thread in a multithreaded search system and search parameters that determine not only what is being sought but also determines the scope of that search.

In accordance with an embodiment of the invention, a module for executing a multiple step database lookup procedure includes a plurality of processing units, each processing unit executing at least one step in the multiple step database lookup procedure with at least two processing units being coupled to a memory containing a database and having multiple input and output ports, and a plurality of data pipelines which couple the plurality of processing units to each other and to external modules.

In accordance with another embodiment of the invention, a device for resolving the routing of network packets, with each packet containing at least one network address, includes a search engine comprised of a plurality of modules including at least one search module, each search module executing a specific database search lookup procedure which retrieves from a memory data related to the at least one network address.

In accordance with a third embodiment of the invention, a method of executing a multiple step address resolution procedure comprises:

a) receiving a search context at a search unit, b) initiating a memory request using search data contained in the search context, c) transmitting the search context to a compare unit, d) receiving data at the compare unit, said data including: the search context, a memory result of the memory request initiated by the search unit, e) determining at the compare unit if further searching is required based on the memory result and search data contained in the search context, f) modifying at the compare unit the search context to produce a modified search context based on the memory result and if further searching is required, g) transmitting the modified search context to the search unit if further searching is required, h) transmitting the modified search context to an external unit if further searching is not required.

BRIEF DESCRIPTION OF THE DRAWINGS

A better understanding of the invention may be obtained by reading the detailed description of the invention below, in conjunction with the following drawings, in which:

FIG. 1 is a block diagram of a hashing lookup procedure implemented by the invention, FIG. 2 is a diagram illustrating the format of a route table entry.

DESCRIPTION OF THE PREFERRED EMBODIMENT

Figure 3:
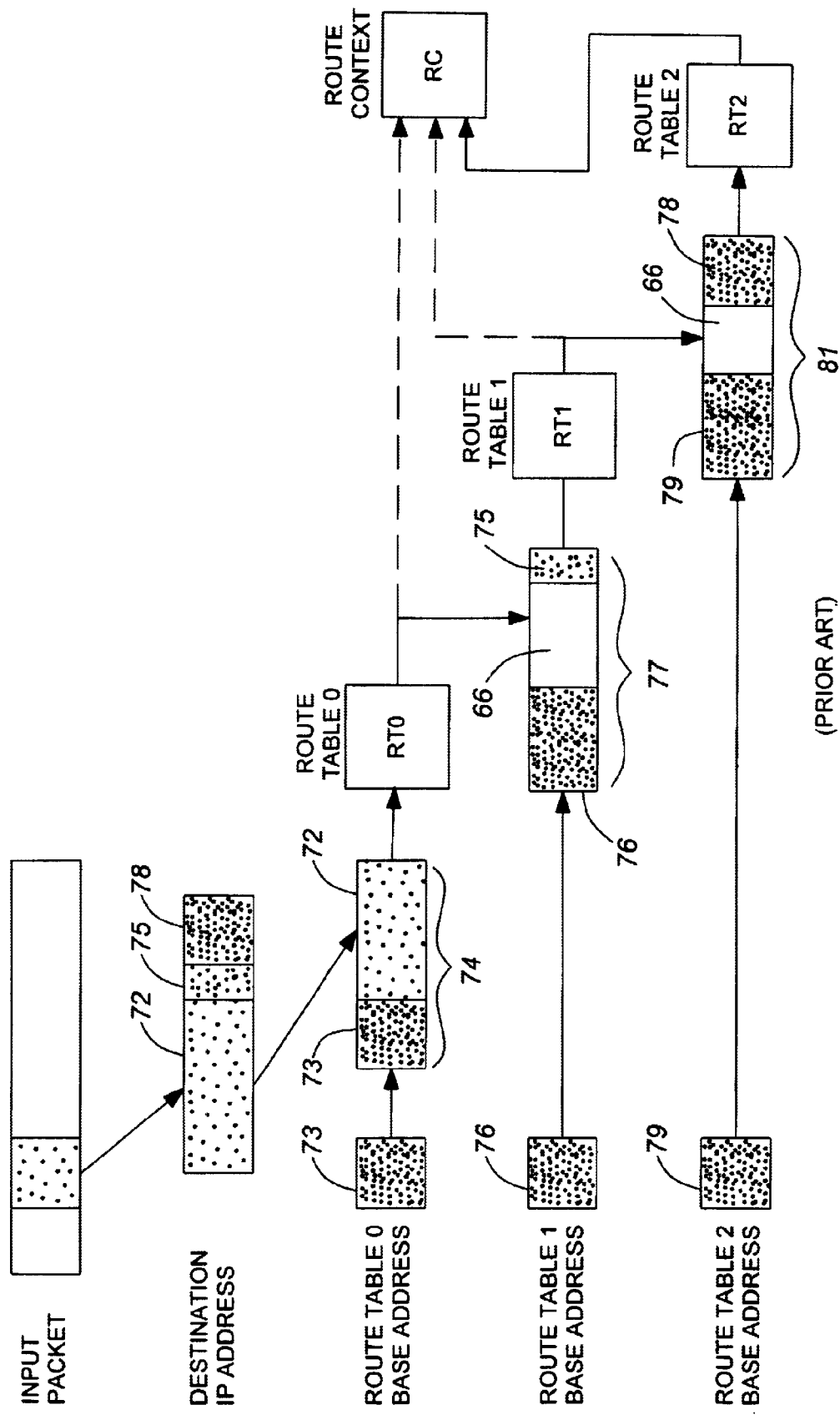
FIG. 3 is a block diagram illustrating the modified Gupta et al procedure implemented by the invention, FIG. 4 are sample route lookup tables used in the examples explaining the multistage route lookup technique.
Figure 5:
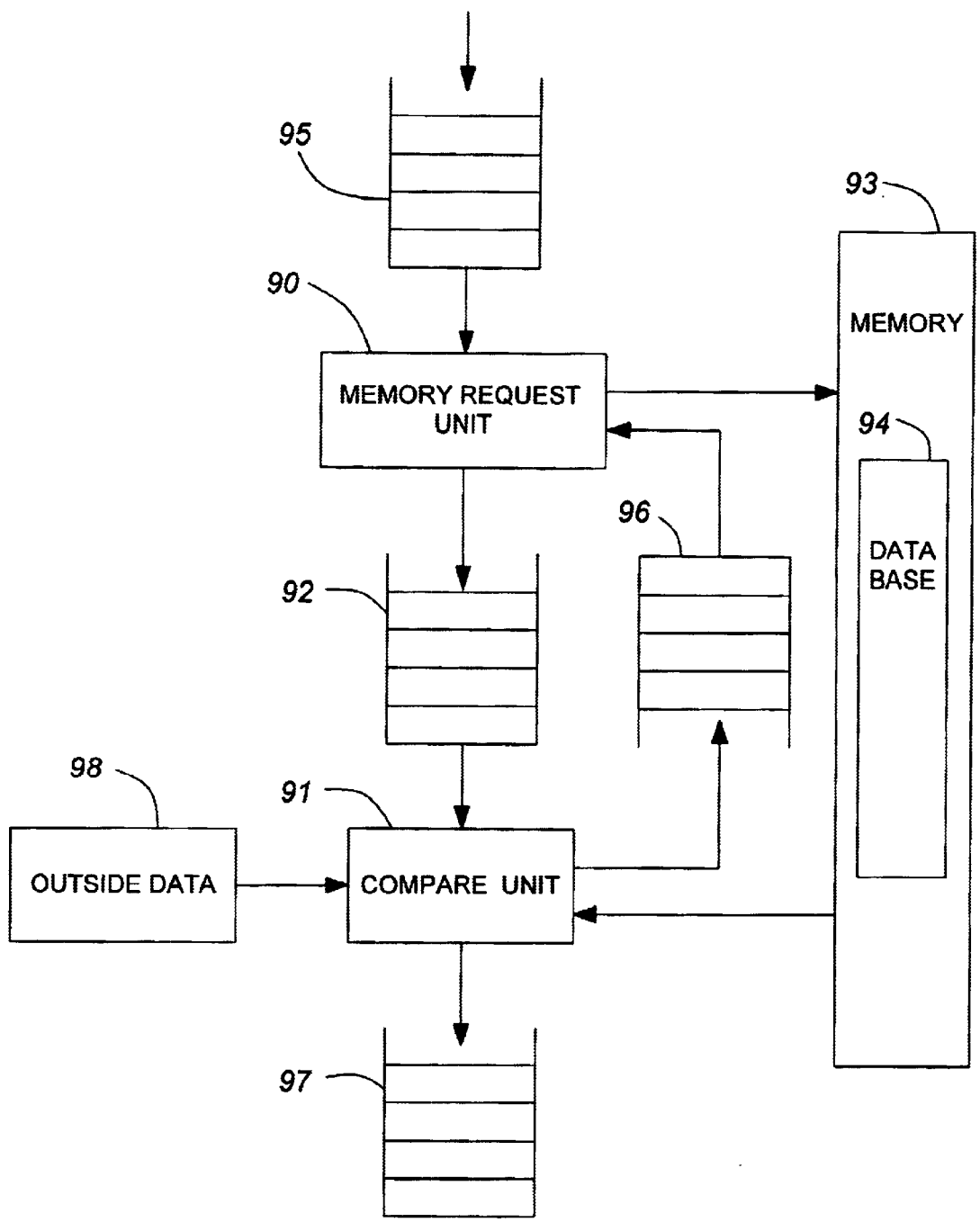
FIG. 5 is a block diagram of a hardware module according to the invention.

Referring to FIG. 5, a module 1 for implementing database lookup procedures is illustrated. A memory request unit 90 is coupled to a compare unit 91 via a data pipeline 92. The memory request unit 90 is also coupled to a memory 93 that contains the database 94 being accessed. Data pipelines 95, 96, 97 are also coupled to either the memory request unit or the compare unit 91. The data pipeline 96 provides a feedback loop between the memory request unit 90 and the compare unit 91. If a database search is insufficient or incomplete, the compare unit 92 can send the search back to the memory request unit 90 via the data pipeline 96.

The data pipeline 95 is coupled to receive input data (normally a search context) from an external module and buffer and retransmit that input data to an input of the memory request unit 90. Data pipeline 92 is coupled to receive an output of the memory request unit 90 for buffering and retransmission to an input of the compare unit 91. The memory request unit 90 also has an output coupled to an input of the memory 93 for accessing the database 94.

The compare unit 91 has an input coupled to receive data from the data pipeline 92. The compare unit 91 also has an output coupled to the data pipeline 96 which provides a feedback loop for the module 1. The data pipeline 96 buffers and retransmits an output of the compare unit 91 to an input of the memory request unit 90.

The compare unit 91 also has an input from an output of the memory 93. This input from the memory 93 receives the results of the memory request initiated by the memory request unit 90. The compare unit can also receive an input from an external source 98. Whether this external input is used or even present depends on the database lookup procedure implemented. The compare unit 91 has an output coupled to a data pipeline 97. The data pipeline 97 is coupled to at least one other external module.

A database search starts with data pipeline 95 receiving a search context from outside the module. The search context includes a search identifier and search parameters. The data pipeline 95, if there are other search contexts that have been previously received but not yet transmitted to the memory request unit 90, buffers the received search context. Since the data pipeline 95 has the qualities of a FIFO list, the search contexts are transmitted to the memory request unit 90 in the order they are received by the data pipeline 95.

Once the search context is received by the memory request unit 90, it then determines from the search parameters contained in the search context the proper memory request to be initiated. This means that the memory request unit 90 determines what database entry needs to be requested and initiates that request. The memory request unit 90, when it initiates the memory request, passes on to the memory 93, an indicator as to the identity of the search. The memory request unit 90, after initiating the memory request, transmits the search context to the data pipeline 92 for buffering and eventual transmission to the compare unit 91.

In the memory 93, after the memory request unit 90 has initiated the memory request, a memory request result is transmitted to the compare unit 91 along with the indicator as to the identity of the search.

At the compare unit 91, once the search context is received from the data pipeline 92 the memory request result received from the memory 93 is matched with the proper search context using the indicator as to the identity of the search. The compare unit 91 then determines if further searching is required. If required, this can be done in conjunction with data received by the compare unit 91 from an outside source 98. For example, if the search is for specific data such as a bit pattern, the outside source 98 transmits the desired bit pattern to the compare unit 91. In this example, the compare unit 91 then compares the memory request result with data from the outside source 98.

Depending on the result of the comparison, the compare unit 91 then transmits a modified search context to either the data pipeline 96 for further searching or to the data pipeline 97 for transmission to another module.

Alternatively, depending on the lookup procedure implemented, the compare unit 91 may simply check if a flag is set in the memory request result to determine if further searching is required.

If further searching is required, the compare unit 91 modifies the search context by changing the search parameters. Once the search parameters have been modified, the compare unit 91 transmits the modified search context to the data pipeline 96 for eventual retransmission to the memory request unit 90. The memory request unit 90 then initiates a new memory request based on the modified search parameters contained in the modified search context.

It should be noted that the data pipelines 95, 92, 96, and 97 have synchronization mechanisms which prevent them from receiving further data once their buffers are full. If, for example, data pipeline 92 has resources to buffer five search contexts, once five search contexts have been received and the buffers of data pipeline 92 are full, a signal is sent to the memory request unit 90 indicating the full condition of data pipeline 90. When the memory request unit 90 receives this signal, it does not transmit any more search contexts to data pipeline 92 until the full signal is has been cleared by data pipeline 92. Similar overflow prevention mechanisms are used with data pipelines 95, 96 and 97.

An alternative mechanism can take the form of a flag set by the data pipeline when the pipeline is full. Before sending data to the data pipeline, a processing unit can check if the flag is set. If the data pipeline is full, then the flag should be set, signalling to the processing unit not to transmit data. The processing unit therefore does not transmit data until the flag is cleared, indicating that the data pipeline is ready and capable of receiving further data.

Figure 6:
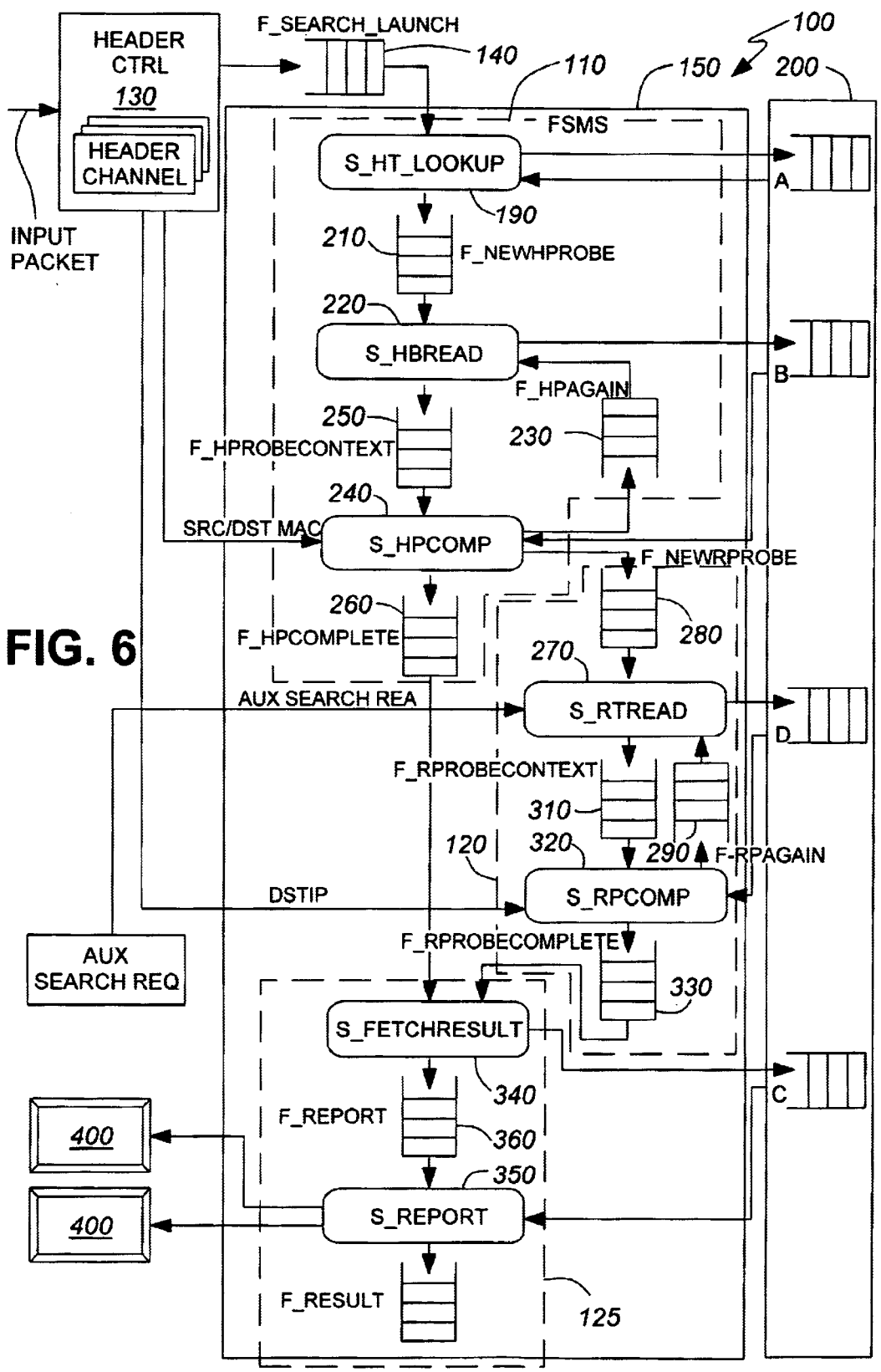
FIG. 6 is a block diagram of a hardware implementation of an address resolution system using two modules according to the invention and implementing the hash lookup procedure and the modified Gupta et al procedure.

Referring to FIG. 6, an address resolution system 100 using two search modules 110, 120 implementing database lookup procedures is illustrated. The module 110 implements a hashing procedure for the MAC address lookup as outlined above. The module 120 implements the modified Gupta et al procedure also as outlined above. A third module 125 performs search result reporting procedures.

The address resolution system 100 performs a MAC address lookup by implementing a hashing procedure and performs the modified Gupta et al procedure for IP longest prefix match. The two modules 110, 120 are contained in an address search engine 150.

Figure 7:
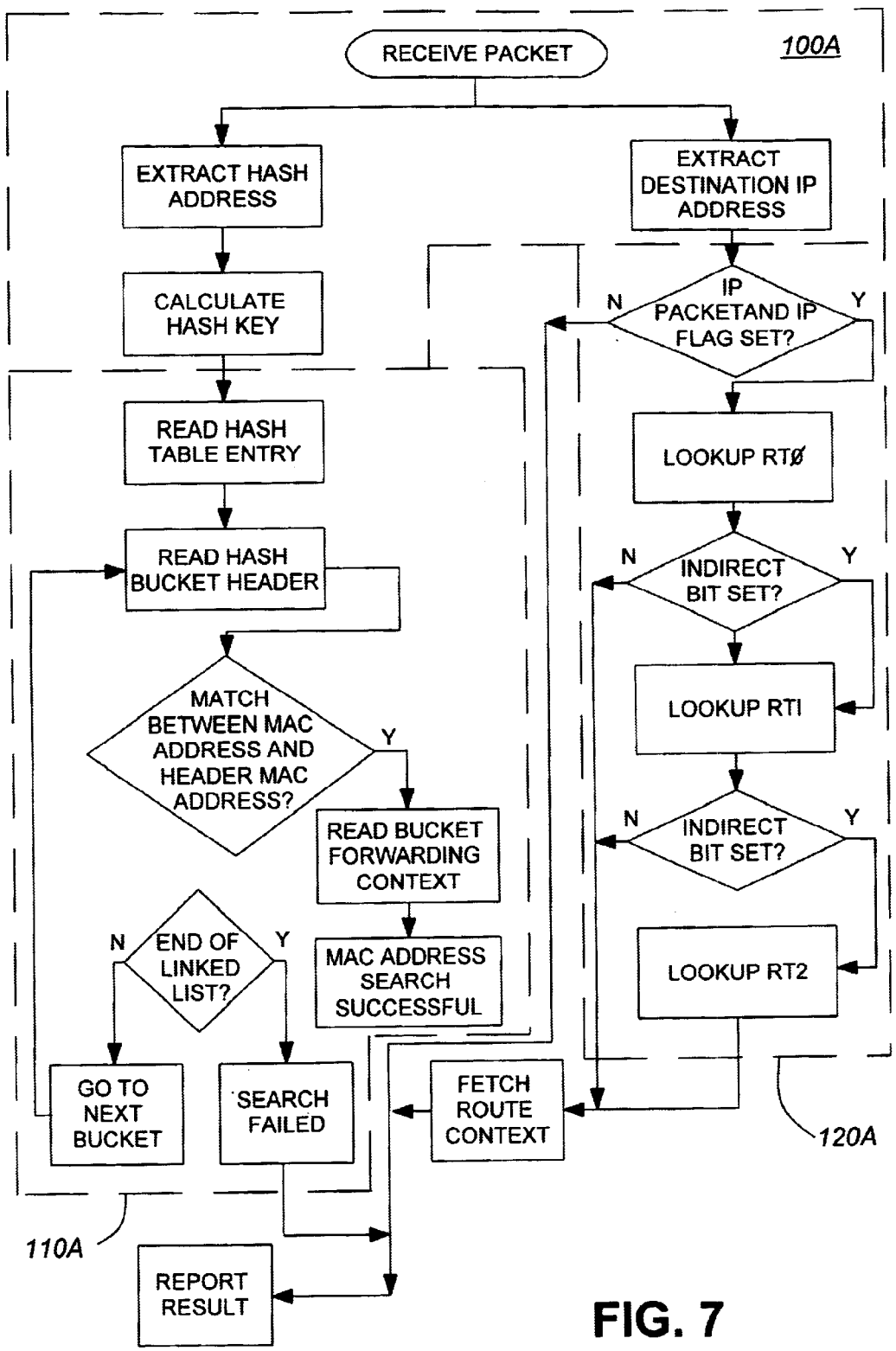
FIG. 7 is a flowchart diagram illustrating the steps taken by the address resolution system illustrated in FIG. 6.

For clarity, FIG. 7 is a flow chart detailing the workings of the address resolution system 100 and more specifically, the workings of the modules 110, 120. Block 110A details the course followed by module 110 while the block 120A details the course followed by module 120. Block 100A details the actions of header control unit 130 illustrated in FIG. 6.

Block 100A shows the preliminary search function carried out by the header control unit 130 such as extracting the addresses to be searched and calculating the hash key.

Block 110A shows the general steps of the hashing procedure carried out by the module 110.

Block 120A shows the general steps of the modified Gupta procedure as implemented by module 120.

To initiate a search, the address resolution system 100 receives a network data packet and, using the header control unit 130, extracts required addresses from the data packet.

These required addresses can include a source MAC address, a destination MAC address, and a destination IP address.

Once the relevant addresses have been extracted by the header control unit 130, a search context is formulated by the header control 130 to be transmitted to the data pipeline 140. If the data packet is an IP data packet, the IP destination address is included in the search context along with a flag that indicates the need for a target IP search and a current step counter detailing which step in the modified Gupta procedure is being executed. If the current step counter is included in the search context, then the counter is initialized with a value of 0.

Also included in the search context are search identifiers assigned by the header control, and a MAC address to be searched. Since the hash procedure outlined above is used for the MAC address lookup, a hash table entry address, calculated by the header control 130 using the MAC address to be searched as the hash key, is also included in the search context. Thus, the search context contains an assigned search identifier, which can be the MAC address to be searched, along with the relevant search parameters such as the hash table entry address, and, if the data packet is an IP data packet, the destination IP address.

Once the search context is transmitted to the data pipeline 140, the search context is buffered for retransmission to the address search engine 150. The search context is transmitted to a preliminary processing unit 190 within the search engine 150.

The preliminary processing unit 190 receives the search context. It then requests the hash table entry from a memory 200 using the hash table entry address contained in the search context. The requested hash table entry is then transmitted by the memory 200 to the processing unit 190. The requested hash table entry contains the address of the first hash bucket header in the MAC address linked list.

The processing unit 190 then modifies the search context by inserting the address of the first hash bucket header in the linked list as part of the search parameters. The search context, containing the modified search parameters, is then transmitted to the data pipeline 210 for buffering and retransmission to a memory request unit s_hbread 220.

The memory request unit s_hbread 220 extracts the search parameters from the search context received from the data pipeline 210. The memory request unit s_hbread 220 then requests from the memory 200 the hash bucket header having the address contained in the search parameters. After initiating the memory request, the memory request unit 220 then transmits the search context to the data pipeline 250 for buffering and retransmission to the compare unit s_hpcomp 240.

The memory request result transmitted to the compare unit s_hpcomp 240 from the memory 200 is a bucket header containing a MAC address and a pointer to the next bucket in the linked list as outlined in the explanation above regarding the hashing procedure.

The compare unit s_hpcomp 240, once it receives the search context from the data pipeline 250 and the memory request result from the memory 200 pairs the memory request result with the proper search context. To determine if further searching is needed, the compare unit s_hpcomp 240 can receive from outside the module 110 the MAC address being searched. In FIG. 6 the compare unit s_hpcomp 240 receives the MAC address being searched from the header control unit 130. Once the search context and memory request result have been paired, the compare unit s_hpcomp 240 matches the MAC address being searched, received by the compare unit s_hpcomp 240 from the header control unit 130, with the MAC address contained in the memory request result. As an alternative to the external input, the MAC address being searched for can also be included in the search context.

If there is a match between the MAC address being searched for and the MAC address contained in the memory request result, then the compare unit s_hpcomp 240 modifies the search context to indicate a successful search. Also, the compare unit 240 inserts in the search context the address of the bucket header with the matching MAC address. This bucket header address with the matching MAC address is later used to retrieve the forwarding context of the MAC address being searched for. The search context is then transmitted to either the data pipeline 260 for reporting or to the data pipeline 280 for an IP longest prefix match. The compare unit 240 determines which data pipeline to transmit the modified search context by checking an IP data flag. This IP data flag can be received from the header control unit 130 along with the MAC address to be searched for or the data flag can be contained in the search context. The IP data flag indicates the presence of an IP data packet. If the flag is set, then the compare unit 240 transmits the modified search context to the data pipeline 280. If the flag is not set then the compare unit 240 transmits the modified search context to the data pipeline 260. The use of the IP data flag eliminates the need to determine whether the MAC address being searched for is a source or a destination MAC address. If the IP data flag is set, this is the only condition when the modified search context is transmitted to the data pipeline 280.

If, on the other hand, there is no match between the MAC address contained in the memory request result and the MAC address being searched for, the compare unit 240 extracts the pointer to the next link in the linked list from the bucket header. This pointer is then used to modify the search parameters in the search context. Since the search parameters contain the address of the bucket header to be retrieved from memory, the pointer is used to modify the search parameters such that the next bucket header to be retrieved is the next bucket header in the linked list. After modification of the search parameters within the search context, the modified search context is transmitted to the data pipeline 230 for retransmission to the memory request unit s_hbread 220 where a new memory request will be initiated based on the modified search parameters.

Since the linked list of bucket headers are usually not infinite in length, the situation can arise wherein the MAC address in the bucket header does not match the MAC address being searched for with the linked list being exhausted. In this situation, the compare unit 240 modifies the search context to indicate that the MAC address search was unsuccessful. The modified search context is then transmitted to the data pipeline 260 for reporting the unsuccessful search, regardless of whether the IP data flag is set or not.

When the search context reaches the data pipeline 280, it has reached the second module 120. From this point on, the search engine 150 will be executing the modified Gupta et al procedure detailed above to search for an exit port for a specific IP address contained in the search context.

As shown in FIG. 6, second module 120 has a structure almost identical to that of the module 110. The data pipeline 280 receives and buffers the incoming search contexts and sequentially retransmits the search contexts to the memory request unit s_rtread 270. From the memory request unit s_rtread 270, search contexts are transmitted and buffered by the data pipeline 310. From the data pipeline 310, search contexts are transmitted to the compare unit s_rpcomp 320.

Depending on the results of the comparison at the compare unit s_rpcomp 320, search contexts are then transmitted to either the data pipeline 290 for a further search or to the data pipeline 330 for reporting.

To fully understand the workings of the module 120, one must follow a search context through the module. Assuming that a MAC address search was successful and that the IP data flag indicated the presence of an IP data packet, the search context is received by the data pipeline 280 from the compare unit 240 of the module 110. The data pipeline 280 then transmits the search context to the memory request unit s_rtread 270.

The memory request unit s_rtread 270, when the search context is initially received, extracts the IP address contained within the search parameters. Once this is accomplished, the most significant 17 bits of the IP address are extracted further, in accordance with the first steps of the modified Gupta procedure as outlined above. These 17 most significant bits of the IP address are added to a predetermined base address of a first route table RT0 to form a complete memory address of a selected entry in the first route table.

The memory request unit s_rtread 270 then initiates a memory request for the selected entry in the first route table using the complete memory address obtained.

The search context is then transmitted from the memory request unit s_rtread 270 to the data pipeline 310 for buffering and eventual retransmission to the compare unit s_rpcomp 320.

The compare unit s_rpcomp 320 determines whether further searching is needed after it receives a result from the memory 200 of the memory request initiated by the memory request unit s_rtread 270. Based on the contents of this result and the contents of the search context, the compare unit s_rpcomp 320 modifies the contents of the search context accordingly and transmits the modified search context to either the data pipeline 290 for further searching or the data pipeline 330 for reporting.

The compare unit s_rpcomp 320 examines the result in conjunction with the search context and the search parameters contained within the seach context. Since the result is an entry in the route table as outlined in the explanation of the modified Gupta et al procedure, the entry will have the format illustrated in FIG. 2. The compare unit s_rpcomp 320 checks both the INDIRECT bit 64 and the valid bit 62 in the route table entry along with the value in the counter that details which step in the modified Gupta procedure is being executed. If the VALID bit 62 is not set, then the search terminates and the compare unit 320 modifies the search context to indicate that the IP address for which an exit port is being sought is an invalid address.

As noted in the explanation of the modified Gupta procedure above, if the INDIRECT bit 64 is set, then more searching is needed. A set INDIRECT bit 64 means that the address contained in the route table entry must be used as a pointer into the next route table.

If the compare unit s_rpcomp 320 determines that the IP address search is successful, that is if the VALID bit is set and the INDIRECT bit is not set, then the address contained in the route table entry received is to be used as a pointer to a route context table entry. The compare unit then copies the address contained in the route table entry to the search context. Also, the compare unit sets a flag within the search context which indicates to the reporting module 125 that the IP search was successful.

The decision table below (Table 1) sets out the actions of the compare unit s_rpcomp 320 given different conditions.

TABLE 1

| Condition (s_rpcomp unit) | Operation |
| --- | --- |
| Valid bit NOT set | Invalid route table entry encountered, write search context to the data pipeline 330 for reporting of the invalid condition |
| INDIRECT bit set and current step counter < 2 (this means that the unit has not received a route table 2 entry) | More searching required. Transmit modified context to data pipeline 290 |
| Current step counter = 2 (this means that the unit has received a route table 2 entry | Maximum number of searches reached, no more searching possible. Ignore the INDIRECT bit and transmit modified search context to data pipeline 330 |
| INDIRECT bit not set | Look up hit at this step. Write modified search context to data pipeline 330 |

Thus, from the table, if both the VALID and INDIRECT bits are set and the current step counter is less than 2, then the compare unit s_rpcomp 320 modifies the search context and transmits the modified search context to data pipeline 290.

The compare unit s_rpcomp 320 modifies the search context by incrementing by one the current step counter in the search context. It then transmits the modified search context to data pipeline 290. The data pipeline 290 then buffers and retransmits the modified search context to the memory request unit s_rtread 270.

The memory request unit 270, (after receiving the modified search context from data pipeline 290), uses the value of the current step counter contained within the search context to determine its actions. Since the module 120 implements the modified Gupta et al procedure, three route tables, RT0, RT1 and RT2 may be accessed along with 3 different base addresses and 3 different parts of the IP address to be extracted to formulate the complete memory address with the memory request to be initiated. The table below (Table 2) details the actions of the memory request unit 270 depending on the value of the current step counter.

TABLE 2

| Current Step Counter Value | Action |
| --- | --- |
| 0 (this means that the search is a brand new IP search) | a) extract 17 most significant bits (MSB17) of IP address<br>b) add MSB17 to the predetermined base address of route table RT0 |
| 1 | a) Extract next 8 most significant bits (8MSB) of IP address<br>b) concatenate 8MSB with the index/pointer contained in the route table entry and the predetermined base address of route table RT1 |
| 2 | a) Extract the 8 least significant bits (8LSB) of IP address<br>b) concatenate 8LSB with the index/pointer contained in route table entry and with the predetermined base address of route table RT2 |

Then, after any of the actions listed above, the memory request unit 270 uses the complete address formulated according to Table 2 to initiate a memory request. The modified search context is then transmitted to the data pipeline 310 for buffering and retransmission to the compare unit s_rpcomp 320.

The memory request unit s_rtread 270 can also receive search contexts and hence search requests from outside the module 120. As can be seen from FIG. 6, the memory request unit s_rtread 270 can receive an auxiliary search request from an external source. Such an external request would comprise a search context with all the necessary search parameters.

Should the particular database lookup procedure being implemented require it, the IP address can be made available to the compare unit s_rpcomp 320 from the header control unit 130. This extra input line into the compare unit s_rpcomp 320 is illustrated in FIG. 6. Such a line can be used to double-check the integrity of the IP address in the search context.

The reporting module 125 receives the search contexts of completed searches from both modules 110 and 120. As can be seen from FIG. 6, a memory request unit s_fetchresult 340 receives the search contexts of completed searches from the data pipelines 330 and 260. The memory request unit s_fetchresult 340 is, along with a reporting unit 350, within the reporting module 125.

Once the memory request unit s_fetchresult 340 receives a search context of a completed search, it determines whether a memory request is required or not. If the search context indicates an unsuccessful search, because of either an invalid IP address or a MAC or IP address that could not be found, the memory request unit s_fetchresult 340 transmits the search context to the reporting unit 350 via the data pipeline 360.

If, on the other hand, the search context indicates a successful search, the memory request unit s_fetchresult 340 determines what type of memory request to initiate. If the successful search was for an IP address, then the memory request unit s_fetchresult 340 initiates a memory request for not only the entry in the route context table RC for the IP address, but also for the forwarding context of the MAC address matched. If the successful search was simply for a MAC address, the forwarding context contained in the matched hash bucket will be retrieved. It should be remembered that the compare unit s_rpcomp 320 inserted the address contained in the route table entry in the search context once the compare unit s_rpcomp 320 had determined that the INDIRECT bit was not set. It should also be remembered that the compare unit s_hpcomp 240 had written in the search context the address of the bucket header with a MAC address which matched the MAC address being sought.

Thus the reporting module 125 retrieves both the route context of the IP address contained in the search context by having the memory request unit s_fetchresult 340 request the entry in the route context table using the pointer contained in the search context to request the rest of the hash bucket from the memory 200.

After the memory request unit s_fetchresult 340 initiates the relevant memory requests, it transmits the search context to the data pipeline 360. The data pipeline 360 then buffers and eventually transmits the search context to the reporting unit 350.

The reporting unit 350 receives the results of the memory requests initiated by the memory request unit s_fetchresult 340 from the memory 200.

If the search context received by the reporting unit s_reports 350 indicates an unsuccessful search, the reporting unit transmits an indication of both the unsuccessful search and the search identifier to circuitry 400 outside the search engine 150.

If the search context received by the reporting unit s_report 350 indicates a successful search, the reporting unit s_report 350 matches the search context received with the memory result transmitted from the memory 200. The reporting unit s_report 350 then transmits both the indication of the successful search and the results of that search, received from the memory 200, to circuitry 400 outside the search engine 150.

It should be noted that while the embodiment illustrated here is a hardware implementation of the invention, a software implementation is also possible.

I claim:

1. An apparatus for executing a multiple step database lookup procedure, said apparatus including:
    a plurality of processing units, at least two processing units being coupled to a memory containing a database to be looked up; and
    a plurality of data pipelines which couple the plurality of processing units to each other and to external apparatus;
    wherein each processing unit executes at least one step in the multiple step database lookup procedure; and
    wherein one of the plurality of processing units is:
        a memory request unit for initiating a memory request from the memory, each memory request resulting in a memory request result transmitted from the memory to at least one processing unit,
        and another of the plurality of processing units is a compare unit for determining if further memory requests are required based on the memory request result.

2. An apparatus as in claim 1 wherein:
    a first memory access output port of the memory request unit is coupled to an input port of the memory, said memory request unit initiating a memory request through the first memory access output port,
    a second memory access output port of the memory request unit is coupled by a first data pipeline to a first input port of the compare unit, said memory request unit forwarding a search context to the compare unit through the second memory access output port,
    a second input port of the compare unit is coupled to an output port of the memory, said compare unit receiving the memory request result of said memory request from the output port of the memory through the second input port of the compare unit,
    a first memory access input port of the memory request unit is coupled to a second data pipeline, said first memory access input port of the memory request unit receiving the search context from said second data pipeline,
    a first output port of the compare unit is coupled by a third data pipeline to a second memory access input port of the memory request unit, and
    a second output port of the compare unit is coupled to a first separate apparatus through a fourth data pipeline, and wherein
        the first data pipeline buffers data between the second memory access output port of the memory request unit and the first input port of the compare unit,
        the second data pipeline buffers the search context entering the first memory access input port of the memory request unit, the third data pipeline buffers data between the first output port of the compare unit and the second memory access input port of the memory request unit, the fourth data pipeline buffers data transmitted by the second output port of the compare unit to the first separate apparatus.

3. An apparatus as in claim 2 further including a preliminary processing unit for retrieving from memory preliminary search data required by the memory request unit before the memory request unit can initiate a memory request, wherein said preliminary processing unit is coupled by the second data pipeline to the memory request unit, said preliminary processing unit is coupled to the memory such that the preliminary processing unit can send and receive data from the memory, and said preliminary request unit is coupled to a second separate apparatus by a fifth data pipeline, said preliminary request unit receiving the search context from the second separate apparatus through the fifth data pipeline.

4. An apparatus as in claim 2 wherein the second data pipeline is coupled to a second separate apparatus, the memory request unit receiving the search context from the second separate apparatus through the second data pipeline.

5. A device for resolving the routing of network packets, each packet containing at least one network address, the device including a search engine comprised of a plurality of modules including at least one search module, each search module executing a specific database search lookup procedure which retrieves from a memory data related to the at least one network address, wherein each search module is coupled to the memory;

wherein the search engine comprises three modules, each module coupled to the other two modules and to the memory, said three modules respectively comprising:

a first search module pipelined for executing a MAC address database lookup procedure, a second search module pipelined for executing an IP address database lookup procedure, a reporting module pipelined for receiving search result data from the two search modules and for retrieving reporting data from memory based on the search result data received from the two modules.

6. A method of executing a multiple step address resolution procedure, said method comprising:

a) receiving a search context at a search unit, b) initiating a memory request using search data contained in the search context, c) transmitting the search context to a compare unit, d) receiving data at the compare unit, said data including: the search context, and a memory result of the memory request initiated by the search unit, e) determining at the compare unit if further searching is required by checking the memory result, f) modifying at the compare unit the search context to produce a modified search context based on the memory result and if further searching is required, g) transmitting the modified search context to the search unit if further searching is required, h) transmitting the modified search context to an external unit if further searching is not required.

7. A method as in claim 6 wherein step e) further includes determining that further searching is required if the memory result is valid and at least one specific bit in the memory result is set.

8. A method as in claim 7 wherein step e) further includes determining that further searching is required if a count in a counter in the search context exceeds a predetermined value.

9. A method as in claim 6 wherein step d) further includes receiving external data at the compare unit, said external data being transmitted from an external unit.

10. A method as in claim 9 wherein step e) further includes determining that further searching is required if result data contained in the memory result matches the external data.

11. A method as in claim 6 wherein step e) further includes determining that further searching is required if result data contained in the memory result matches search data contained in the search context.

12. A method as in claim 8 wherein step f) further includes modifying the search context to produce a modified search context by:

incrementing by one the counter in the search context, and inserting index data contained in the memory result into the search context.

13. A method as in claim 11 wherein step f) further includes modifying the search context to produce a modified search context by inserting pointer data contained in the memory result into the search context.

14. A method as in claim 6 further including the steps of:

a1) initiating a preliminary memory request, a2) receiving a preliminary memory request result, a3) inserting the preliminary memory request result into the search context for transmission to the search unit, wherein steps a1)–a3) are performed prior to step a) and wherein the preliminary memory request result is data required by the search unit to initiate an initial memory request.

15. A method as in claim 7 wherein step e) further includes determining if the memory result is valid by determining if a valid bit in the memory result is set.

16. A method as in claim 8 wherein step e) further includes determining if the memory result is valid by determining if a valid bit in the memory result is set.

17. A method as defined in claim 6, wherein said search context includes a search identifier for identifying a specific search thread in a multithreaded search system, and wherein said search context includes at least one search parameter.

18. A method as defined in claim 17, wherein said search identifier is assigned by a header control unit.

19. A method as defined in claim 18, wherein said header control unit extracts a first address and a second address from said search data, and outputs a search context based on said first address and said second address.

20. A method as defined in claim 19, wherein said header control unit transmits said search context to said search unit.

21. A method as defined in claim 19, wherein said header control unit, executes the following steps:

calculates a hash table entry address on said first address by implementing a hashing procedure; and outputs said hash table entry address into said search context.

22. A method as defined in claim 20, wherein said hash table entry address is included in said modified search context.

23. A method as defined in claim 21, wherein said hash table entry address forms one of said at least one search parameter.

24. A method as defined in claim 21, wherein said first address is a medium access control address.

25. A method as defined in claim 24, wherein said second address is an internet protocol address.

* * * * *